Jan. 5, 1965  A. G. BRAINERD, JR., ETAL  3,164,456
AIR FILTER
Filed Jan. 25, 1962
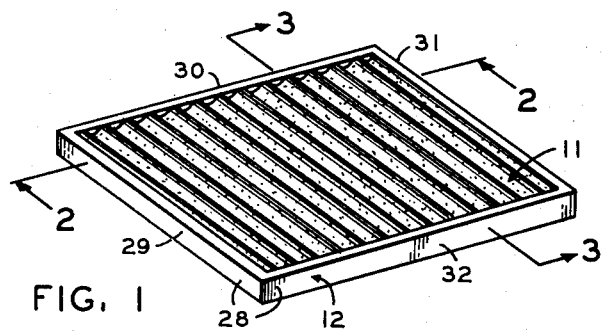
FIG. 1
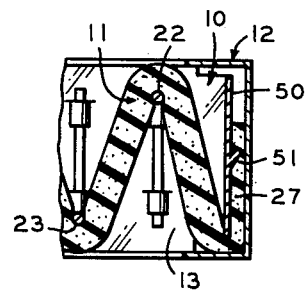
FIG. 5
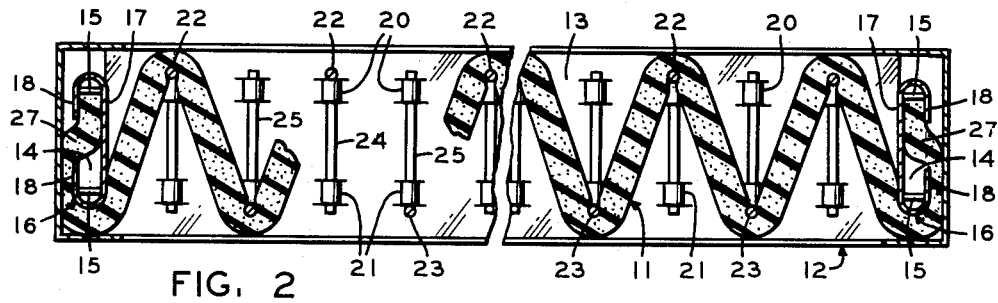
FIG. 2
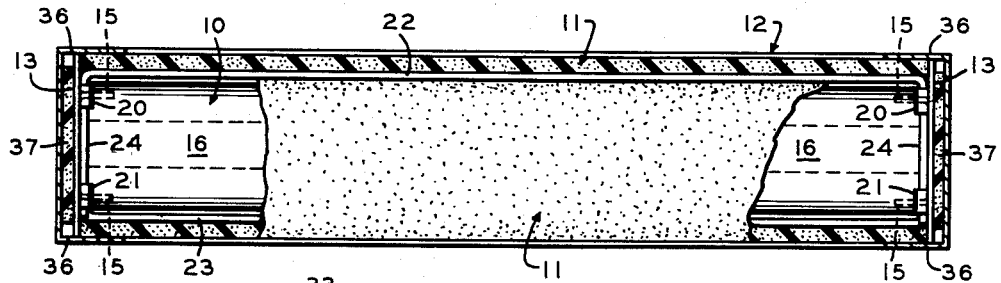
FIG. 3
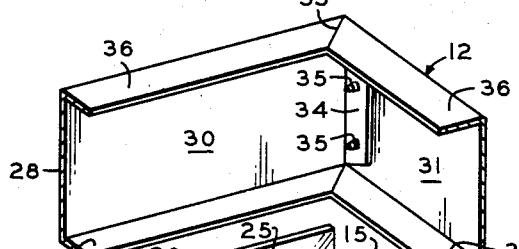
FIG. 4
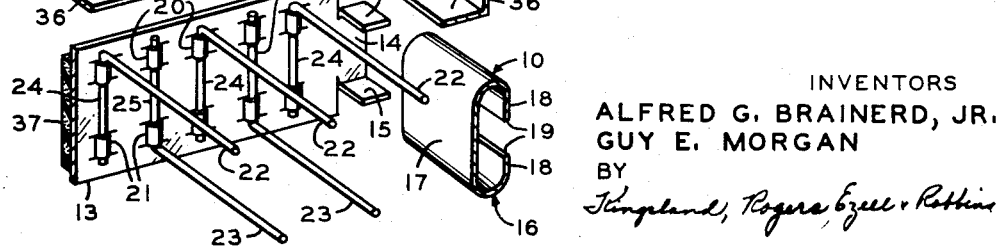
INVENTORS
ALFRED G. BRAINERD, JR.
GUY E. MORGAN
BY
ATTORNEYS

United States Patent Office 3,164,456
Patented Jan. 5, 1965

3,164,456
AIR FILTER
Alfred G. Brainerd, Jr., 6913 Glenwood, and Guy E. Morgan, 5701 Belmont, both of East St. Louis, Ill.
Filed Jan. 25, 1962, Ser. No. 168,780
6 Claims. (Cl. 55—500)

This invention relates to an air filter and more particularly to the combination of a frame and a corrugated filtering medium, such as Urethane foam, supported thereby.

In general, the filter comprises an inner frame including flanged side plates and doubled over end plates interlocked with the side plate flanges. There are two rows of equally spaced rods alternately spaced between the end plates and releasably fastened to the side plates. A sheet of Urethane foam is passed alternately about the rods and is secured to each end plate. An outer frame comprising channel members welded, riveted, or screwed together surrounds the inner frame.

One of the significant features of the invention is its economic construction and ease of assembly. The rods which are releasably fastened to the side plates automatically position the side plates relative to one another and thereby lock the end plates in place because the end plates interlock with the flanges on the side plates. Hence the inner frame is self-locking and its assembly requires no special tooling. Even the outer frame is of simple construction. It comprises a one piece standard channel member that is notched and bent to a rectangular shape and is fastened together at a single closing corner. This corner fastening may be a screwed flange connection, riveting, welding, or the like.

The Urethane foam sheet is fastened to the outer sides of the end plates. Consequently, a portion of the Urethane foam sheets is pressed between the end plates and the adjacent outer frame channel member. Strips of Urethane foam sheet are also disposed between the inner frame side plates and the opposing outer frame channel members. As a result, there is the Urethane foam filtering media at all points within the outer frame channel members so that no air can pass through the filter without being filtered.

A principal object of this invention is to provide a corrugated Urethane foam filter including a self-locking frame for supporting a sheet of Urethane foam.

Another object of the invention is to provide a corrugated Urethane foam filter including a frame for supporting a Urethane foam sheet that is easy to assemble and is very economical in cost.

Still another object of the invention is to provide a corrugated Urethane foam filter that has an inner frame for supporting a sheet of Urethane foam and an outer frame by which the filter is installed with means to assure filtering of air at any point within the outer frame.

Another object of the invention is to provide a dry media filter of sufficient efficiency to be practical and to increase the total surface area thereby increasing dust holding capacity and reducing static pressure drop across the filter.

Other objects will appear from the description to follow.

In the drawings:
FIGURE 1 is an isometric view of the filter on a reduced scale;
FIGURE 2 is a fragmentary view in section taken along the line 2—2 of FIGURE 1;
FIGURE 3 is a view in section taken along the line 3—3 of FIGURE 1;
FIGURE 4 is a fragmentary and exploded corner view of the inner and outer frames also showing the rods and showing a side sheet of Urethane foam; and
FIGURE 5 is a fragmentary view in section similar to the right side of FIGURE 2, but showing an alternate form of the invention.

Referring now to the drawing, the filter comprises an inner frame 10 which supports a corrugated sheet of Urethane foam 11 in a manner to be described, and an outer frame 12. The inner frame 10 includes a pair of side plates 13, each of which has two end flanges 14 of smaller width than the side plates 13. These end flanges 14 have bent-over upper and lower tabs 15 which project at right angles to the plates 13. The inner frame 10 also has a pair of doubled-over end plates 16 which are not as wide as the side plates 13. As shown in FIGURE 4, the end plates 16 have an inner wall 17 and bent-over longitudinal flanges 18 spaced outwardly from the inner wall 17. There is a space between the flanges 18 and the inner wall 17 of the end plates, and the end flanges 14 fit within that space to support the end plates 16. There is also a space between the edges 19 of the longitudinal flanges 18.

There are a plurality of pairs of axially aligned crimped retainers 20 and 21 which project from the inner face of each side plate 13. These retainers 20 and 21 support two rows of rods 22 and 23. The rods 22 and the rods 23 alternate with one another along the side plates 13. Each of the rods 22 has bent-down ends 24 that fit within a pair of retainers 20 and 21 on each side plate 13. Each of the rods 23 has bent-up ends 25 that also fit within a pair of retainers 20 and 21, but from the opposite direction to that of the ends 24. These rods 22 and 23, when engaged within their respective retainers 20 and 21, hold the side plates 13 together and thereby hold the flanges 15 within the ends of the end plates 16.

The ends 24 on the rods 22 and the ends 25 on the rods 23 are initially bent to angles of somewhat greater than 90°. Therefore, when the rod ends are in place in the retainers 20 and 21, they are biased outwardly against the side plates 13. Since the angles of the ends 24 to the rods 22 and 23 are greater than 90°, they are held in the retainers 20 and 21 by friction while the Urethane foam is installed. Also, they bow outwardly somewhat, and thereafter, when the Urethane foam sheet is put on, it draws the rods 22 and 23 into straight lines. If the rods were not initially bowed outwardly, the foam sheet, when added would bow the rods inwardly.

The Urethane foam 11 is in the form of a flexible sheet. As shown in FIGURE 2, the sheet of Urethane foam 11 is wrapped alternately about the rods 22 and 23. The opposite ends 27 of the Urethane foam sheet 11 are passed around an edge of the end plates 16, and through the space between the edges 19 of the flanges 18 whence they are wedged into the space between one of the flanges 18 and the opposing inner wall 17. With the Urethane foam sheet 11 in the installed condition illustrated in FIGURE 2, it holds the rods 22 and 23 in place within their respective retainers 20 and 21.

Finally, there is the outer frame 12. The outer frame comprises a channel member 28 notched and bent to four sides 29, 30, 31 and 32 as illustrated. This leaves two free ends of the channel at one corner 33. At this corner 33, one of the channel ends has a flange 34 on it which is fastened to the other channel end by one or more screws 35. The four sides of the channel member 28 fit around the inner frame 10 with the upper and lower flanges 36 confining the side plates 13. Two of the channel sides 29 and 31 press the ends 27 of the Urethane foam sheet 11 against the flanges 18 of the end plates 16. There are two strips 37 of Urethane foam sheet between the channel sides 30 and 32 and the side plates 13.

The ends 27 of the Urethane foam sheet 11 and the separate sheets 37 of Urethane foam assure that no air can pass between the inner and outer frames 10 and 12 without also passing through the filtering medium. From the foregoing description of this filter, it is evident that it comprises only a few parts and yet effectively holds the Urethane sheet 11 in a corrugated condition. The advantages of the corrugated Urethane foam are that it thereby presents a greater surface area for filtering air and thus performs its job more effectively.

The ease of assembly of this filter should be evident from the foregoing description. The flanges 15 of the side plates 13 are inserted into the ends of the doubled-over end plates 16. Then the ends 24 and 25 of the rods 22 and 23, respectively, are inserted into their respective pairs of retainers 20 and 21 to lock the side plates 13 and end plates 16 in place. Next, an end 27 of the Urethane foam sheet 11 is inserted into the space between a flange 18 and the inner wall 17 of an end plate 16, and the Urethane foam sheet 11 is wound alternately about the rods 22 and 23. Then its other end 27 is inserted into the space between a flange 18 and the inner wall 17 of the other end plate 16. The Urethane foam sheet 11 retains the rods 22 and 23 within their respective retainers 20 and 21. The doubled-over flange construction of the end plates 16 holds the ends 27 of the Urethane foam sheet 11 firmly in place. Finally, the channel member 28 (preceded by the positioning of two Urethane foam sheets 37) is placed around the inner frame 10 and is fastened together at its closing corner 33 by the screw 35.

The parts of the filter are self-locking. The ends 27 of the Urethane foam sheet 11 are locked within the spaces between the flanges 18 of the end plates 16 and between one flange 18 and the opposing inner wall 17. The Urethane foam sheet 11 holds the rods 22 and 23 in place. The rods 22 and 23 hold the side plates 13 and the end plates 16 in place.

A slightly modified form of the invention is shown in FIGURE 5. In this modification, the side plates 13 are the same as those already described; so are the rods 22 and 23. So is the outer frame 12 and so is the Urethane foam sheet 11. However, instead of the doubled-over end plates 16, the filter of FIGURE 5 has straight plates 50 that are welded or screwed to the side plates 13. Sharp tabs 51 are bent away from the end plates 50. The end 27 of the Urethane foam sheet 11 is bent about an edge of the end plates 50 and is hooked onto the sharp tabs 51. The additional Urethane foam sheets 37 are also used with the filter of FIGURE 5 so that no air can pass through the filter without being filtered.

Various changes and modifications may be made within the apparatus of this invention as will be readily apparent to those skilled in the art. Such changes and modifications are within the scope and teaching of this invention as defined by the claims appended hereto.

What is claimed is:

1. A filter comprising an inner frame and an outer frame, the inner frame comprising side plate members and end plate members, a pair of parallel rows of rods fastened to the side plate members and extending therebetween, a sheet of flexible Urethane foam having its ends fastened to the outer side of the end plate members and being wound about alternate ones of the rods to dispose the Urethane foam in a corrugated sheet, the outer frame having two parallel channel sides and two parallel ends opposite the side plate members and the end plate members respectively, the channel ends compressing the ends of the Urethane foam sheet between them and the end plate members, the rods having means to hold the side plate members in position relative to the end plate members, and flanges on the ends of the side plate members for interlocking with the end plate members.

2. The filter of claim 1 with separate sheets of Urethane foam pressed between the side plate members and the opposing outer frame channel sides.

3. The filter of claim 1 wherein the rods are releasably positioned by retainers in the side plate members and the Urethane foam sheet holds the rods within their respective retainers.

4. A filter comprising a frame having side plate members and end plate members, the side plate members having two rows of rod retainers and also having flanges at their outer ends, the end plate members having doubled-over flanges along their upper and lower edges, a pair of rows of rods having bent ends extended within the retainers, and a sheet of foam filtering medium having two opposite ends each clamped between an end plate member and an end plate flange and being wrapped alternately about the rods, the rods being held in the retainers by the foam sheet and the side and end plate members being held together by the rods.

5. The filter of claim 4 wherein the bent ends of the rods are biased outwardly against the side plates.

6. The filter of claim 5 wherein each rod end is received within a pair of axially aligned retainers.

References Cited in the file of this patent

UNITED STATES PATENTS

| 2,074,294 | Woodruff | Mar. 16, 1937 |
| 2,415,579 | Dahlman | Feb. 11, 1947 |
| 2,999,562 | Letchtenberg | Sept. 12, 1961 |

FOREIGN PATENTS

| 3,863 | Australia | Sept. 29, 1932 |